US006370210B1

United States Patent
Yamamoto

(10) Patent No.: US 6,370,210 B1
(45) Date of Patent: Apr. 9, 2002

(54) CIRCUITRY FOR GENERATING A GAIN CONTROL SIGNAL APPLIED TO AN AGC AMPLIFIER AND METHOD THEREOF

(75) Inventor: Takeshi Yamamoto, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/315,824

(22) Filed: May 21, 1999

(30) Foreign Application Priority Data

May 21, 1998 (JP) ............................................. 10-139966

(51) Int. Cl.⁷ ............................................... H04L 27/08
(52) U.S. Cl. ................... 375/345; 455/234.1; 455/245.1
(58) Field of Search ................................. 375/316, 318, 375/344, 345, 224, 227, 228; 455/226.1, 226.2, 226.3, 232.1, 239.1, 240.1, 245.1, 250.1

(56) References Cited

U.S. PATENT DOCUMENTS 4,007,428 A  *  2/1977  Brown et al.
4,570,127 A  *  2/1986  Tanimoto et al.
5,050,192 A  *  9/1991  Nawata
6,137,647 A  * 10/2000  Voorman et al.

FOREIGN PATENT DOCUMENTS

| JP | 06-216677 | 8/1994 |
| JP | 07-20235 | 1/1995 |
| JP | 08-293748 | 11/1996 |
| JP | 09-74323 | 3/1997 |

* cited by examiner

*Primary Examiner*—Jean Corrielus
(74) *Attorney, Agent, or Firm*—Sughrue Mion, PLLC

(57) ABSTRACT

In order to rapidly converge a gain control operation of an AGC amplifier which is provided for amplifying burst signals, a level of an incoming bust signal is detected. Following this, a signal indicative of the level of the burst signal is latched in response to a first latch control signal. On the other hand, an output of said AGC amplifier is derived and a level deviation thereof from a reference level is detected. Subsequently, a signal indicative of the level deviation is latched in response to a second latch control signal. The above-mentioned gain control signal is generated using the two kinds of signals held in the latches.

6 Claims, 3 Drawing Sheets

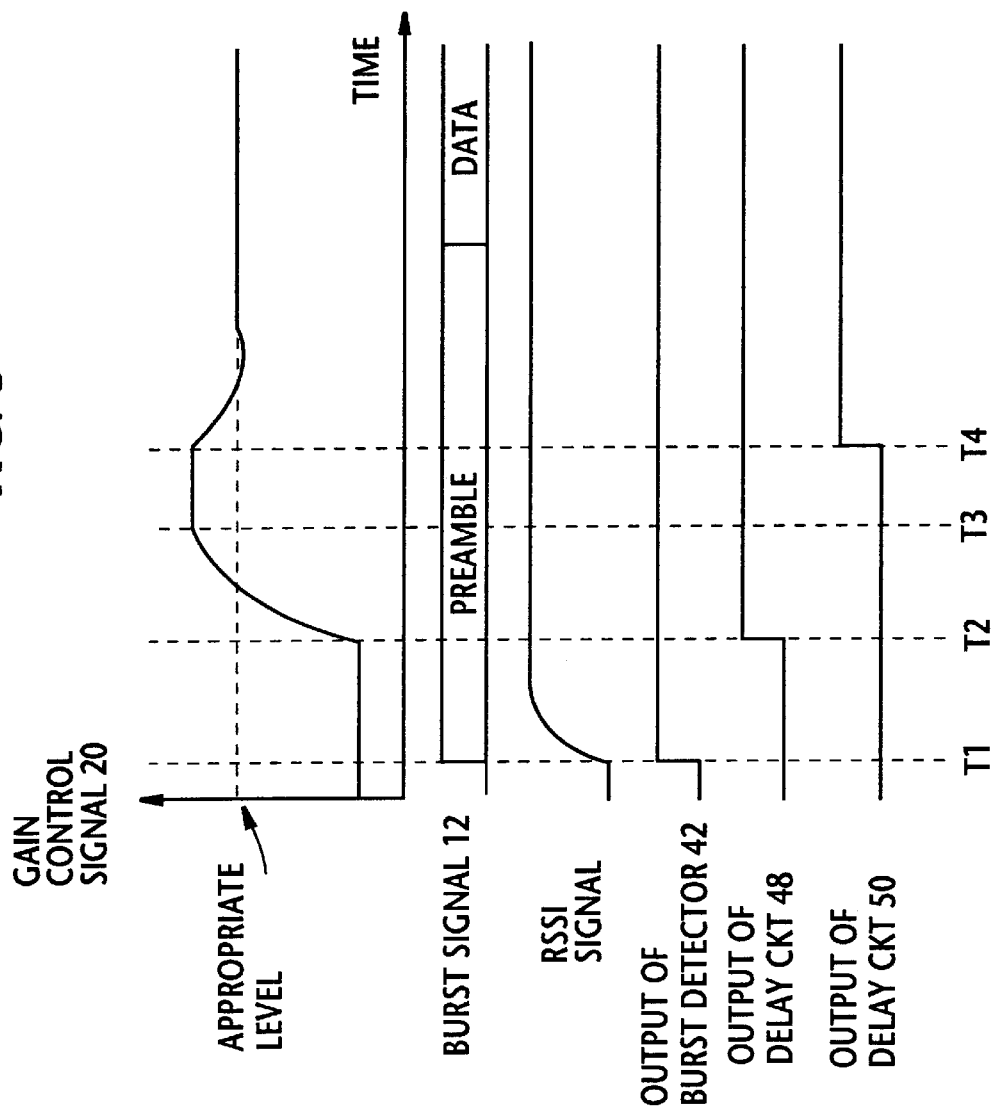

CIRCUITRY FOR GENERATING A GAIN CONTROL SIGNAL APPLIED TO AN AGC AMPLIFIER AND METHOD THEREOF

BACKGROUND OF THE INVENTION

1. Field of the Invention

The present invention relates generally to techniques for generating an amplifier's gain control signal in a digital radio communications system, and more specifically to circuitry and method of generating a control signal that is used to adjust a gain of an AGC (automatic gain control) amplifier to which burst signals are applied.

2. Description of the Related Art

In a radio communications system, a signal radiated from a transmitter is subject to undesirable level changes and hence, it is typical to provide a receiver with an AGC amplifier. In the case of signal transmission in burst, a preamble that precedes a data portion is used to adjust a gain of the AGC amplifier. However, a conventional gain control circuit has suffered from the problem that it is difficult to rapidly converge the gain adjusting operation. This is because the conventional technique has adjusted the gain of the AGC amplifier by way of feedback control. More specifically, the output of the AGC amplifier is compared with a reference level and the comparison result is fed back to the AGC amplifier for controlling the gain thereof. Therefore, with a conventional technique, it is necessary to undesirably elongate the preamble in order to correctly adjust the gain of the AGC amplifier. However, if a total time period of each burst is fixed, the aforesaid conventional approach is objectionable because the extended preamble sacrifices the space reserved for data.

SUMMARY OF THE INVENTION

It is therefore an object of the present to provide a circuit for rapidly converging a gain control operation of an AGC amplifier that is provided for amplifying burst signals.

Another object of the present invention is to provide a method of rapidly converging a gain control operation of an AGC amplifier that is provided for amplifying burst signals.

In brief, these objects are achieved by techniques wherein in order to rapidly converge a gain control operation of an AGC amplifier which is provided for amplifying burst signals, a level of an incoming bust signal is detected. Following this, a signal indicative of the level of the burst signal is latched in response to a first latch control signal. On the other hand, an output of the AGC amplifier is derived and a level deviation thereof from a reference level is detected. Subsequently, a signal indicative of the level deviation is latched in response to a second latch control signal. The above-mentioned gain control signal is generated using the two kinds of signals held in the latches.

One aspect of the present invention resides in a circuit for generating a gain control signal for use in controlling a gain of an AGC amplifier via which burst signals are amplified, comprising: first means for detecting a level of a bust signal applied to the AGC amplifier, second means for detecting a level deviation of an output of the AGC amplifier from a reference level; and third means for latching a first signal indicative of the level of the burst signal and latching a second signal indicative of the level deviation, the third means generating the gain control signal using the first and second signals.

Another aspect of the present invention resides in a method of generating a gain control signal for use in controlling a gain of an AGC amplifier via which burst signals are amplified, comprising the steps of (a) detecting a level of a bust signal to be applied to the AGC amplifier, (b) latching a signal indicative of the level of the burst signal in response to a first latch control signal; (c) detecting a level deviation of an output of the AGC amplifier from a reference level; (d) latching a signal indicative of the level deviation in response to a second latch control signal; and (e) generating the gain control signal using the signals latched at steps b) and (d).

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 3 is a timing chart which depicts the operations which characterize the embodiment of the present invention.

DETAILED DESCRIPTION OF THE PREFERRED EMBODIMENTS

Figure 1:
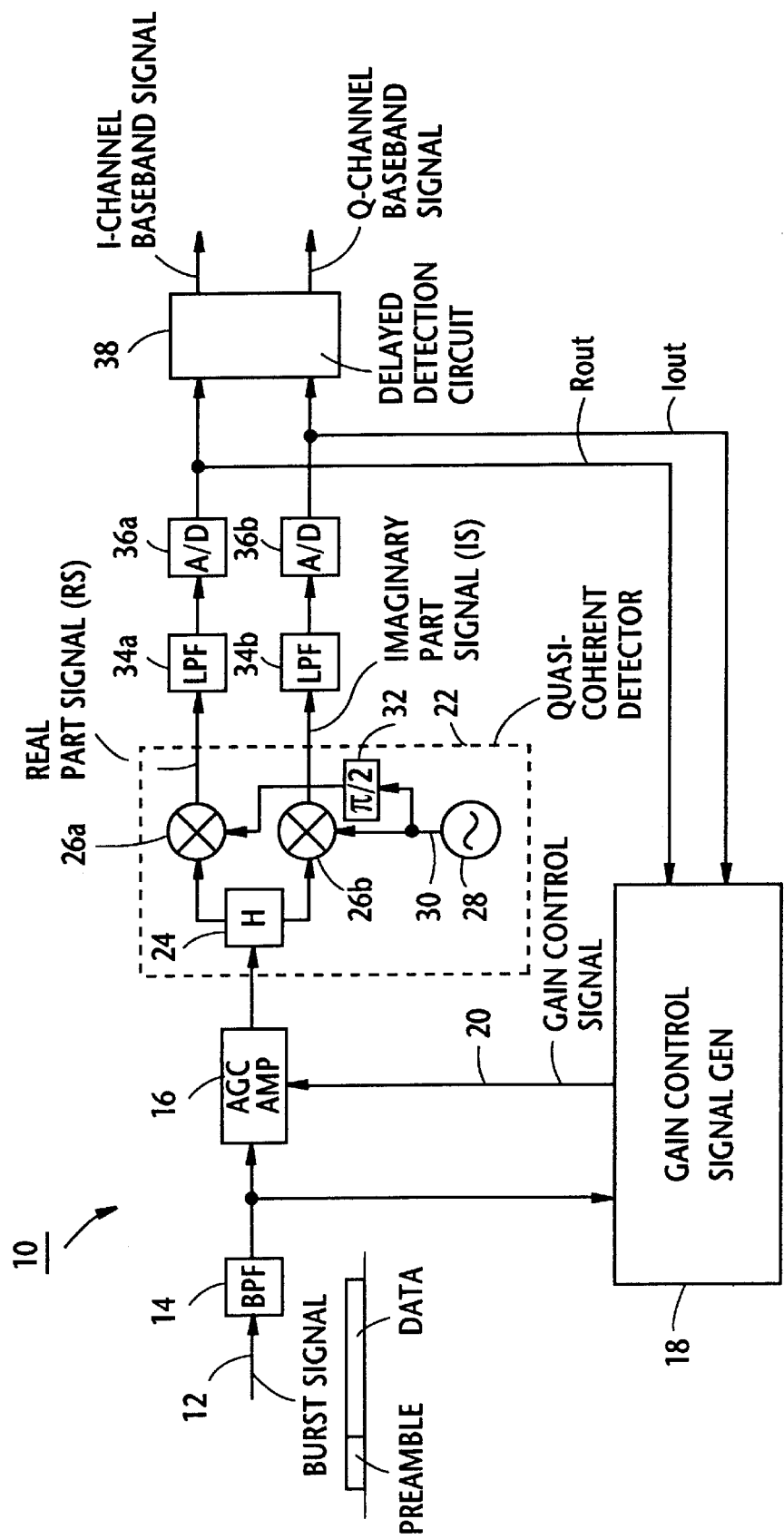
FIG. 1 is a block diagram schematically showing a demodulating section of a receiver, with which an embodiment of the present invention is described.

One embodiment of the present invention will be described with reference to FIGS. 1 to 3. FIG. 1 schematically shows a demodulation section of a receiver (depicted by numeral 10), which is relevant to the present invention.

A burst signal 12, which carries phase modulated baseband signals, is applied, via a band-pass filter 14, to an AGC amplifier 16 and a gain control signal generator 18. The gain of the amplifier 16 is controlled such as to take a value, appropriate for the amplifier 16 to generate an output with a predetermined level, under the control of a gain control signal 20 that is applied from the gain control signal generator 18. The AGC amplifier 16 is to compensate for the level variation of the burst signal 12, which has been introduced while the signal 12 is transmitted. The burst signal 12 is typically an IF (intermediate signal) outputted from an IF stage of a receiver (not shown).

The output of the AGC amplifier 16 is applied to a quasi-coherent detector (demodulator) 22. That is, the output of the amplifier 16 is applied, via a hybrid circuit 24, to multipliers 26a and 26b. A local oscillator 28 generates a signal 30 whose frequency has been set to a carrier frequency radiated from a transmitter (not shown). The local signal 30 is directly applied to the multiplier 26b and, on the other hand, the signal 30 is applied to the other multiplier 26b after being phase-shifted by $\pi/2$ at a phase-shifter 32. The multiplier 26a, which multiples the output of the amplifier 16 by the phase-shifted local signal 30, generates a real part signal (RS) of a complex signal that corresponds to the baseband signal. On the other hand, the other multiplier 26b, which multiples the output of the amplifier 16 by the local signal 30, generate an imaginary part signal (IS) of the above mentioned complex signal. As is well known in the art, a coherent detector carries out a synchronous demodulation using a carrier frequency reproduced from a received signal. In other word, the carrier signal, reproduced or recovered in the coherent detector, is exactly in synchronism with the incoming phase-modulated signal. However, in the instant embodiment, since the local oscillator 28 is isolated, the output 30 is not in synchronism with the carrier signal received by the receiver. This is the reason that the block 22 is termed as "quasi-coherent demodulator".

The signal Rs and Is, which are respectively outputted from the multipliers 26a and 26b, are applied, via low-pass filters 34a and 34b, to analog-to-digital (A/D) converters 36a and 36b. A delayed detection circuit 38 is supplied with the outputs of the A/D converters 36a and 36b, and generates an in-phase channel (channel) baseband signal and a quadrature-phase (Q-channel) baseband signal. On the other hand, the outputs of the A/D converters 36a and 36b are applied to the gain control signal generator 18.

Figure 2:
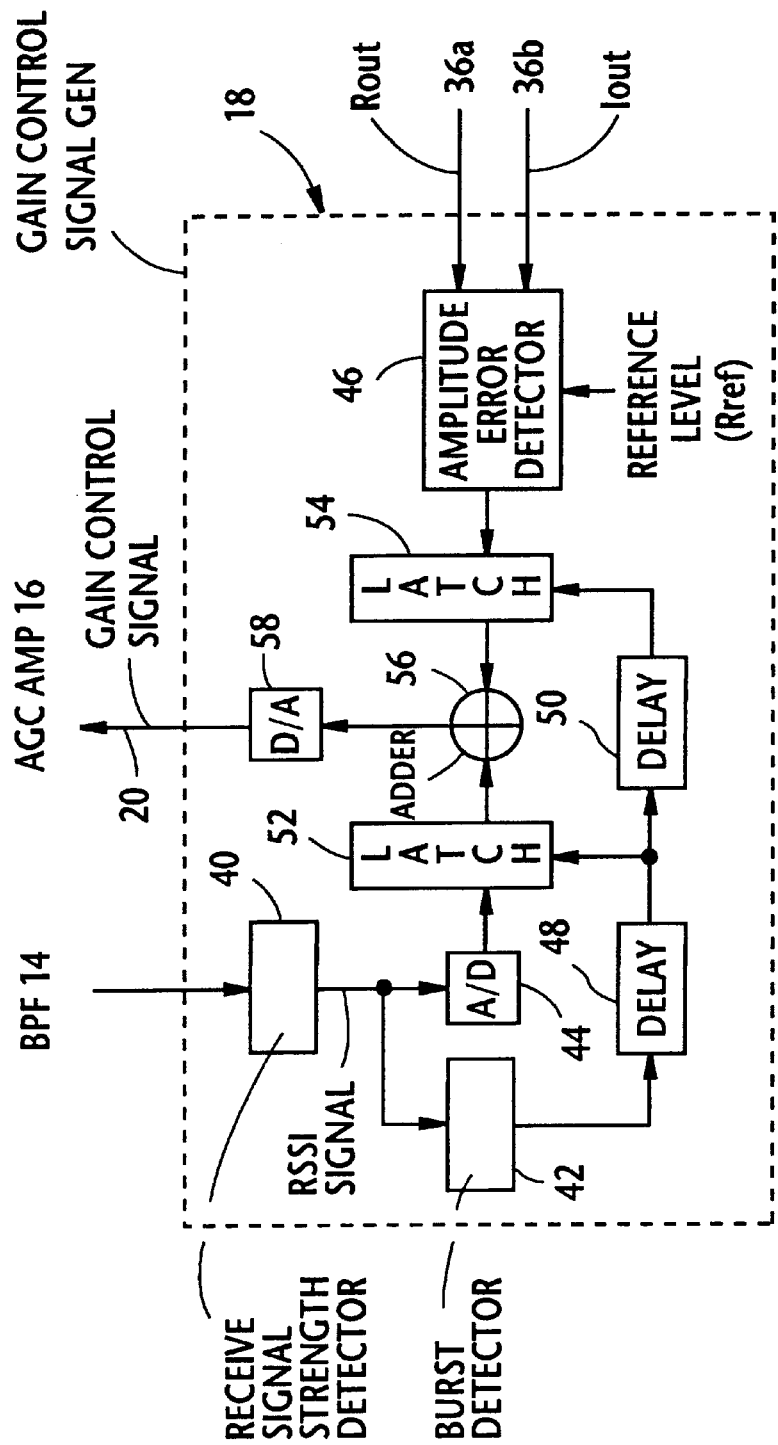
FIG. 2 is a diagram showing a block of FIG. 1 in detail.

FIG. 2 is a diagram illustrating the gain control signal generator 18 in detail in block diagram form. As shown in FIG. 2, the signal generator 18 comprises a receive signal strength detector 40, a burst signal detector 42, an analog-to-digital (A/D) converter 44, an amplitude error detector 46, two latches 52 and 54, two delay circuits 48 and 50, an adder 56, and a digital-to-analog converter 58.

The receive signal strength detector 40 typically takes the form of logarithmic amplifier and outputs a receive signal strength indication (RSSI) signal. The RSSI signal is then applied to the burst detector 42 at which the leading edge of the incoming burst signal (viz., the leading edge of the preamble) is detected. The output of the burst detector 42 is delayed at the delay circuits 48 and 50. On the other hand, the RSSI signal is converted to the corresponding digital signal at the A/D converter 44. The latch 52, in response to an output of the delay circuit 48, acquires the digitized signal strength signal outputted from the A/D converter 44.

The amplitude error detector 46 is supplied with the outputs (depicted Rout and Iout) of the A/D converters 36a and 36b, and calculates the square root of the sum of the respective squares of Rout and Iout. That is, designating the calculation result as Cr, the following equation is given.

$$Cr=(Rout^2+Iout^2)^{1/2}$$

The amplitude error detector 46 compares the calculation result Cr and a reference level Rref, and generates an amplitude error which is latched in response to the output of the delay circuit 50. The adder 56 adds the digital values stored in the latches 52 and 54, and applies the sum thereof to the D/A converter 58. Thus, a gain control signal (analog) 20 is fed to the AGC amplifier 16 from the D/A converter 58.

The operation of the circuit shown in FIGS. 1 and 2 will be described with reference to FIG. 3.

Each of the latches 52 and 54 empties the content thereof before the generator 18 initiates the control operation thereof with each burst signal. It is assumed that at a time point T1, the burst detector 42 detects the presence of the burst signal 12, in response to which the detector 42 takes an output which assumes a high level. The output of the burst detector 42 is delayed up to a time period T2. The amount of the delay (viz., T2−T1) is determined such as to be is sufficient for the RSSI signal to assume a stable state. In other words, when the output of the delay circuit 48 takes a high level at the time point T2, the output of the signal strength detector 40 should substantially be stable or take a definite value. The latch 52 responds to the rising edge of the output of the delay circuit 48 and latches the output of the A/D converter 44. At this time point, the content of the latch 54 is zero. Therefore, the D/A converter 58 converts the saturated RSSI signal to the corresponding analog signal that is applied to the AGC amplifier 16 as the gain control signal 20. The transition of the gain control signal 20 between the time point T2 and T3 is due to the operation at the D/A converter 58.

After the gain control signal 20 enters into a stable state at the time point T3, the output of the delay circuit 50 takes a high level, in response to which the latch 54 acquires, at a time point T4, the output of the amplitude error detector 46. In the case illustrated in FIG. 3, the gain control signal 20 exceeds an appropriate level and therefore, the output of the amplitude error detector 46 functions such as to lower the level of the gain control signal 20.

It is understood from the foregoing that the feedback control is implemented using the A/D converters 36a–36b, the amplitude error detector 46, the delay circuit 50, the latch 54, etc. On the other hand, the feedforward control is carried out using the signal strength detector 40, the A/D converter 44, the delay circuit 48, the latch 52, etc.

Theoretically, if the amplitude of the incoming burst signal 12 is determined, it is possible to control the gain of the AGC amplifier 16 and thus, the feedback control is not needed. However, there exist in practice a variety of undesirable factors that adversely affect the gain control of the AGC amplifier. Some examples of such factors are the errors introduced when measuring the receive signal strength at the detector 40, inaccurate gain adjustment at the AGC amplifier 16, scattering of parameters with different products, variations of performance characteristics due to environment temperature changes, etc. As a result, it is not necessary to compensate for the control error left by the feedforward control.

In the above, the gain control signal generator 18 is provided with the A/D converter 44 and the D/A converter 58. However, these converters 44 and 58 may be omitted, in the case of which the amplitude error detector 46 should receive the outputs of the low-pass filters 34a and 34b. The burst detector 42 is coupled to the output of the receive signal strength detector 40. However, as an alternative, the burst detector 42 may be coupled such as to directly receive the incoming burst signal 12.

It will be understood that the above disclosure is representative of only one possible embodiment of the present invention and that the concept on which the invention is based is not specifically limited thereto.

What is claimed is:

1. A circuit for generating a gain control signal for use in controlling a gain of an AGC amplifier via which burst signals are amplified, comprising:

first means for detecting a level of a burst signal applied to said AGC amplifier, second means for detecting a level deviation of an output of said AGC amplifier from a reference level; and third means for latching a first signal indicative of said level of the burst signal and latching a second signal indicative of said level deviation, said third means generating said gain control signal using said first and second signals.

2. A circuit as claimed in claim 1, wherein said third means comprises:

a burst detector for detecting a time point around which the burst signal is applied to said AGC amplifier, a latch control signal generator coupled to receive an output of said burst detector, said latch control signal generator generating a first and second latch control signals;

a first latch for latching said first signal in response to said first latch control signal;

a second latch for latching said second signal in response to said second latch control signal; and means for generating said gain control signal by combining said first and second signals respectively latched in said first and second latches.

3. A circuit as claimed in claim 2, wherein said latch control signal generator comprises a first and second delay circuits coupled in series, said first delay circuit delaying the output of said burst detector for providing said first latch control signal, and said second delay circuit further delaying the output of said burst detector for providing said second latch control signal.

4. A method of generating a gain control signal for use in controlling a gain of an AGC amplifier via which burst signals are amplified, comprising the steps of;

(a) detecting a level of a burst signal to be applied to said AGC amplifier, (b) latching a signal indicative of said level of the burst signal in response to a first latch control signal;

(c) detecting a level deviation of an output of said AGC amplifier from a reference level;

(d) latching a signal indicative of said level deviation in response to a second latch control signal; and (e) generating said gain control signal using the signals latched at steps (b) and (d).

5. A method claimed in claim 4, wherein said second latch control signal occurs with a predetermined time period after said first latch control signal is generated.

6. A method claimed in claim 4, further comprising the steps of:

(f) detecting a leading edge of the burst signal to be applied to said AGC amplifier and generating a signal indicative of a time point at which the leading edge has been detected;

(g) delaying said signal indicative of said time point and generating said first latch control signal; and (h) further delaying said signal indicative of said time point and generating said second latch control signal.

\* \* \* \* \*